United States Patent
Reimann et al.

[19]

[11] Patent Number: 6,142,265
[45] Date of Patent: Nov. 7, 2000

[54] ARRANGEMENT FOR OPERATING A BRAKE OF A VEHICLE

[75] Inventors: Gregor Reimann, Pentling; Karl-Heinz Roess, Ebersbach, both of Germany

[73] Assignee: DaimlerChrysler AG, Stuttgart, Germany

[21] Appl. No.: 09/159,498

[22] Filed: Sep. 23, 1998

[30] Foreign Application Priority Data

Sep. 23, 1997 [DE] Germany .................. 197 41 868

[51] Int. Cl.$^7$ ...................................... B60L 7/00
[52] U.S. Cl. .......................... 188/158; 188/162
[58] Field of Search .................... 188/158, 162, 188/156, 161, 163, 164, 72.1, 72.8, 71.1, 71.2, 71.8, 71.9; 303/115.2, 162, 20; 318/139, 372, 362, 374; 310/83, 77, 75 R, 76, 80, 92; 192/84.6; 701/22

[56] References Cited

U.S. PATENT DOCUMENTS

| | | | |
|---|---|---|---|
| 4,546,298 | 10/1985 | Wickham et al. | 188/162 |
| 4,793,447 | 12/1988 | Taig et al. | 188/72.8 |
| 4,804,073 | 2/1989 | Taig et al. | 188/72.8 |
| 4,809,824 | 3/1989 | Fargier et al. | 188/72.8 |
| 4,836,338 | 6/1989 | Taig | 188/72.8 |
| 4,850,457 | 7/1989 | Taig | 188/72.1 |
| 5,219,049 | 6/1993 | Unterborn | 188/156 |
| 5,348,123 | 9/1994 | Takahashi et al. | 188/72.8 |
| 5,388,674 | 2/1995 | Severinsson | 188/162 |
| 5,915,504 | 6/1999 | Döricht | 188/72.4 |
| 5,971,110 | 10/1999 | Martin | 188/72.8 |
| 6,012,556 | 1/2000 | Blosch et al. | 188/162 |

FOREIGN PATENT DOCUMENTS

| | | |
|---|---|---|
| 0 666 207 A1 | 8/1995 | European Pat. Off. . |
| 87-00707 | 12/1987 | France . |
| 4229042A1 | 3/1993 | Germany . |
| 4207640A1 | 9/1993 | Germany . |
| 19621533A1 | 12/1997 | Germany . |
| 64-21229 | 1/1989 | Japan . |
| 3-500920 | 2/1991 | Japan . |
| 8-312693 | 11/1996 | Japan . |
| 89/10495 | 11/1989 | WIPO . |
| WO97/45653 | 4/1997 | WIPO . |

OTHER PUBLICATIONS

Japanese Office Action ("Letter of Provisional Rejection"), Application No. 297495/1998, Jun. 25, 1999, Examiner Kotaro Toda (with English translation).
Search Report, United Kingdom, Dec. 16, 1998.

*Primary Examiner*—Douglas C. Butler
*Attorney, Agent, or Firm*—Evenson, McKeown, Edwards & Lenahan, P.L.L.C.

[57] ABSTRACT

An arrangement for operating a brake of a vehicle has at least one controllable electric motor and at least one conversion device for converting the rotational movement of the electric motor into a translational movement of one or several brake element(s) operatively connected with the conversion device. The conversion device has two sloped disks which are arranged coaxially with respect to the electric motor, and whose first sloped disk can be caused to carry out a rotating movement by way of a step-down gear driven by the electric motor and whose second sloped disk, by way of roller bodies arranged between the two sloped disks, is axially displaceable by a rotating movement of the first sloped disk.

19 Claims, 1 Drawing Sheet

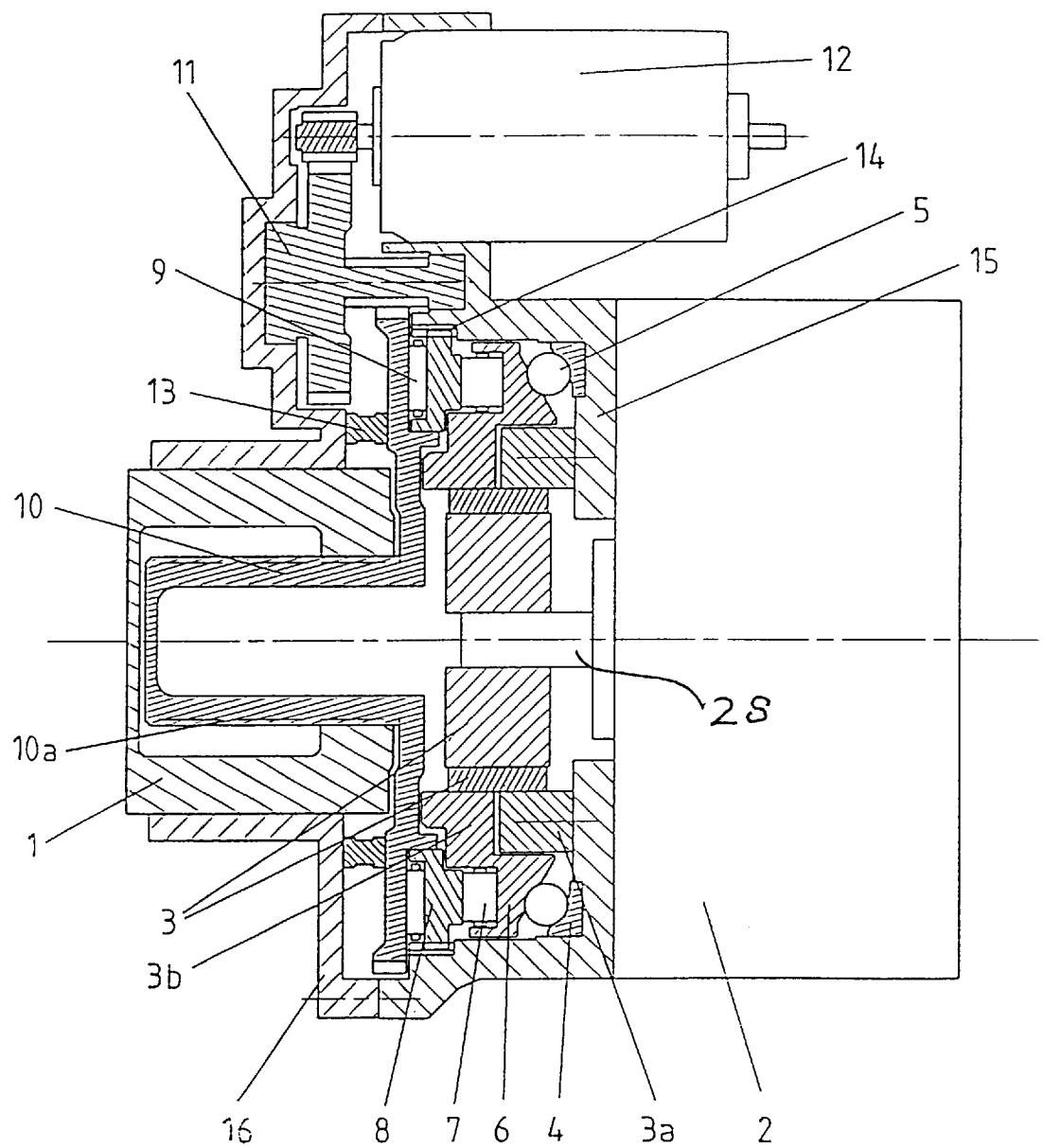

ARRANGEMENT FOR OPERATING A BRAKE OF A VEHICLE

BACKGROUND AND SUMMARY OF THE INVENTION

This application claims the priority of German application 197 41 868.6-21, filed in Germany on Sep. 23, 1997, the disclosure of which is expressly incorporated by reference herein.

The invention relates to an arrangement for operating a brake of a vehicle having at least one controllable electric motor and at least one conversion device for converting the rotational movement of the electric motor into a translational movement of one or several brake element(s) operatively connected with the conversion device.

Increasing density in road traffic requires motor vehicle systems which contribute to the driver's safety and relief. In this case, the trend in the automobile industry is in the direction of autonomous driving. Here, the driver is aided by "by-wire systems" and is relieved in many driving situations by intelligent systems. Current brake systems consist predominantly of hydraulic or pneumatic transmitting and boosting devices by means of which the driver directly defines the braking intervention of the wheel brake. In order to implement driver-independent braking interventions in the case of these systems, in addition to the necessary pressure supply, high expenditures with respect to component parts, such as valves, hydraulic cylinders, and the like, are required in order to control driver-independent braking interventions, for example, for a ranging control. For this reason, electromechanical wheel brakes were suggested which can be controlled electrically and make the use of hydraulic or pneumatic transmitting and boosting devices superfluous.

This type of an arrangement is known, for example, from German Patent Document DE 42 29 042 A1. In this arrangement, the electric motor is assigned to a brake element. The conversion device converts the rotational movement of the electric motor into a translational movement which results in a linear displacement of a driving piston. A fluid chamber is provided between the driving piston and a brake lining contact pressure piston, by means of which brake lining contact pressure piston, the brake linings are pressed against a brake disk. A brake fluid is situated in the fluid chamber.

In the case of this arrangement for operating a brake of a vehicle, it is advantageous that, in a danger situation, which arises, for example, when the electric motor is defective and can therefore not cause a return movement of the brake linings, the brake can be released by a pressure reduction in the brake fluid. However, in the case of this arrangement, it is a problem that, despite the electric controllability, it requires the use of a hydraulic system and thus requires brake fluid and therefore not only results in higher expenditures but, in particular, is also less environmentally friendly than a so-called "dry" brake, that is, a brake which requires no hydraulic fluid whatsoever.

Furthermore, from German Patent Document DE 42 07 640 A1, a friction brake, particularly a disk brake, is known for vehicles as well as a process for braking a vehicle, which has an electromagnetic friction clutch which is brought into a controllable frictional connection with a friction member, preferably the brake disk. By way of a toothed drive, the friction clutch is in a form-locking rotary engagement with a piston which can be axially adjusted by a rotating-direction-independent V-drive and which is part of an application device for brake linings assigned to the brake disk. For pressing the brake linings against the brake disk, energy is removed from the rotating vehicle wheel by means of the friction clutch and is assigned to the application device.

Although, in the case of this brake, a self-locking is impossible, it is a problem and a disadvantage of this brake that the electromagnetic friction clutch itself is subject to wear and therefore requires additional maintenance work on the brake which is connected with costs. Furthermore, by means of such a brake, only limited contact pressure forces can be generated by means of which the brake linings are pressed against the brake disk.

Furthermore, in the case of this arrangement, a very fast intermittent controlling of the brake is problematic since, in particular, a very fast releasing of the brake by means of the friction clutch and the toothed drive is not easily possible.

It is therefore an object of the invention to provide an arrangement for operating a brake of the initially mentioned type which, while its construction is compact, permits a very fast, also intermittent operating of a "dry" brake which can be controlled in a computer-aided manner. In particular, a braking intervention as well as a releasing of the brake is to be possible in a very rapid manner by means of standard electric motors.

In the case of an arrangement for operating a brake of a vehicle of the initially mentioned type, this object is achieved according to the invention in that the conversion device comprises two sloped disks which are arranged coaxially with respect to the electric motor, whose first sloped disk can be caused to carry out a rotating movement by means of a step-down gear driven by the electric motor, and whose second sloped disk, by way of roller bodies, which are arranged between the two sloped disks, is axially displaceable by a rotating movement of the first sloped disk.

As the result of the fact that the rotating movement of the electric motor is converted into a translational movement by a step-down gear and two sloped disks arranged coaxially to the electric motor, while the construction is extremely compact, a longitudinal displacement of an adjusting piston of a brake disk is advantageously achieved by means of a very high force which is obtained by a high torque of the step-down gear and the direct transmission by way of the two sloped disks onto the adjusting piston.

Purely in principle, the sloped disks can be constructed and disposed in various manners.

A very advantageous embodiment provides that the first sloped disk is part of a step-down gear. This not only eliminates additional structural elements, in particular, such an arrangement also very advantageously permits an extremely compact construction.

Particularly with respect to a construction, which is simple because it requires few parts and is therefore insusceptible to disturbances and simultaneously very compact, it is furthermore advantageously provided that the first sloped disk forms a part of a bearing which is arranged in a housing and which is used for bearing the rotatable first sloped disk in the housing.

As far as the construction of the first sloped disk is concerned, it is particularly advantageous, especially with respect to a construction which is extremely compact in the axial direction, that the first sloped disk has a step-shaped profile which, on the one hand, at least partially encloses the step-down gear in the axial direction, and, on the other hand, is used for receiving the roller body.

In this manner, while the construction of the whole conversion device is very compact, the first sloped disk simultaneously carries out several functions.

No detailed information has been supplied above concerning the roller bodies. In an advantageous embodiment, it is provided that the roller bodies are ball bodies or roll bodies.

For the simple and reliable transmission of the translational movement exercised by the second sloped disk to the brake elements in the form of brake linings, it is provided that the second sloped disk exercises an axially directed force in a rotationally uncoupled manner by way of bearings onto an adjusting element and by way of the latter onto an adjusting piston. Brake linings are arranged on the adjusting piston itself so that the axial force is also applied to these.

In order to, on the one hand, facilitate the return movement and thus the releasing of the brake by the electric motor and the conversion unit, and, on the other hand, hold the parts forming the above-described conversion unit in their position, it is advantageously provided that, by way of one or several restoring devices supported on the housing, a restoring force is applied to the adjusting element, the first and the second sloped disk and the bearing which is opposite to the force generated by the second sloped disk during a rotating movement of the first sloped disk.

The second sloped disk is preferably guided axially and radially in the housing by means of a ring.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic view of an embodiment of an arrangement for operating a brake of a vehicle which uses the invention.

DETAILED DESCRIPTION OF THE DRAWINGS

An embodiment of an arrangement for operating a brake of a (not shown) vehicle illustrated in the FIGURE comprises a housing which is composed of two mutually connected housing parts 15, 16. An electric motor 2 is flanged to one of the two housing parts 15 and drives a step-down gear 3, such as a harmonic-drive gear or a toothed differential gear.

In this case, one part 3a of the step-down gear 3 is fixedly connected with the housing part 15, while another part 3b of the step-down gear 3 is used for driving a first sloped disk.

The axially fixed first sloped disk 6 is axially and radially supported by means of a bearing 5 on the housing part 15. A running surface for the bearing is constructed on the first sloped disk 6. The other running surface is fastened to the housing part 15. Between the two running surfaces, roller bodies of the bearing 5, such as the illustrated balls, are arranged which permit a low-noise and low-wear running while the friction is low and the efficiency of the bearing 5 is high.

On its side facing the motor shaft 2S, the first sloped disk 6 is toothed and is in a direct engagement with the step-down gear 3. As a result, the first sloped disk 6 is, on the one hand, part of the step-down gear 3 as well as, on the other hand, part of the bearing 5. The first sloped disk has a step-shaped profile and encloses the step-down gear, on the one hand, partially and, on the other hand, this step-shaped profile permits the receiving of roller bodies, for example, of the illustrated roll bodies 7, which are arranged between the first sloped disk 6 and a second sloped disk 8. The second sloped disk 8 is axially and radially guided in the housing half 16 by means of a ring 14.

By means of the step-shaped profile, in particular, an extremely compact construction of the whole arrangement is permitted in the axial direction.

A rotating movement of the motor 2 is transmitted by way of the step-down gear 3 by the first sloped disk 6 by means of the roller bodies 7 to the second sloped disk 8 which, in this manner, carries out a movement in the axial direction of the whole arrangement. This axial movement of the second sloped disk 8 is transmitted by way of bearings 9 in a rotationally uncoupled manner to an adjusting element 10 and is transmitted by the latter to an adjusting piston 1 on which (not shown) brake linings are arranged. By means of this axial movement an adjusting of the brake is achieved. A releasing of the brake is achieved by a rotation of the electric motor 2 in the reverse direction.

As illustrated, the adjusting piston 1 is axially displaceably disposed in the second housing half 16.

Between the second housing half 16 and the adjusting piston 10, restoring devices are arranged in the form of restoring springs 13 which promote not only the restoring of the adjusting element 10 and thus of the adjusting piston 1 but also prestress the two sloped disks 6, 8, the roll bodies 7 arranged between them and the bearing 5.

As illustrated in the FIGURE, the adjusting piston 1 can be adjusted by way of the adjusting element 10 by means of a second electric motor 12 which is followed by a spur gear 11. For this purpose, the adjusting element 10 has an external toothing which engages in a toothing of the spur gear 11. In this case, the adjusting element 10, which is only axially displaced by means of the first electric motor and the two sloped disks 6, 8, is caused to carry out a rotating movement. In this case, the axial displacement of the adjusting piston 1 takes place by means of a thread 10a which is arranged on an axial part of the adjusting element 10 and in which a toothing engages which has a construction which complements this thread 10a and which is arranged on an axial interior side of the adjusting piston 1 which faces the cylindrical portion of the adjusting element 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for operating a brake of a vehicle, said arrangement comprising:

a controllable electric motor, and a conversion device for converting the rotational movement of the electric motor into a translational movement of a brake element operatively connected with the conversion device, wherein the conversion device comprises two sloped disks which are arranged coaxially with respect to the electric motor, and whose first sloped disk can be caused to carry out a rotational movement by a step-down gear driven by the electric motor, and whose second sloped disk, by way of roller bearings which are arranged between the two sloped disks, is axially displaceable by means of a rotating movement of the first sloped disk.

2. Arrangement according to claim 1, wherein the first sloped disk is part of the step-down gear.

3. Arrangement according to claim 2, wherein the first sloped disk is part of a bearing arranged in a housing.

4. Arrangement according to claim 3, wherein the first sloped disk has a step-shaped profile which at least partially encloses the step-down gear in the axial direction and wherein the first sloped disk is used for receiving roller bodies of the roller bearings.

5. Arrangement according to claim 4, wherein the second sloped disk is axially and radially guided in the housing by a ring.

6. Arrangement according to claim 1, wherein the first sloped disk is part of a bearing arranged in a housing.

7. Arrangement according to claim 6, wherein the second sloped disk is axially and radially guided in the housing by a ring.

8. Arrangement according to claim 1, wherein the first sloped disk has a step-shaped profile which at least partially encloses the step-down gear in the axial direction and wherein the first sloped disk is used for receiving roller bodies of the roller bearings.

9. Arrangement according to claim 8, wherein the roller bodies are ball bodies or roll bodies.

10. Arrangement according to claim 8, wherein the second sloped disk exercises an axially directed force in a rotationally uncoupled manner, by way of bearings, on an adjusting element and, by way of the adjusting element, on a brake adjusting piston.

11. Arrangement according to claim 10, wherein at least one restoring device supported on a housing applies a restoring force to the adjusting element, to the first and second sloped disks and to the bearing which is opposed to the force generated by the second sloped disk during a rotation of the first sloped disk.

12. Arrangement according to claim 1, wherein the second sloped disk exercises an axially directed force in a rotationally uncoupled manner, by way of bearings, on an adjusting element and, by way of the adjusting element, on a brake adjusting piston.

13. Arrangement according to claim 12, wherein at least one restoring device supported on a housing applies a restoring force to the adjusting element, to the first and second sloped disks and to the bearing which is opposed to the force generated by the second sloped disk during a rotation of the first sloped disk.

14. A vehicle brake actuator assembly comprising:
a housing,
a brake element actuating piston supported for linear movement in the housing,
an electric motor with a rotatably driven motor shaft, and
a conversion device operable to convert rotational movement of the motor shaft to linear movement of the actuating piston,
wherein said conversion device includes first and second sloped disks arranged coaxially with the motor shaft, said first disk being rotationally driven by said motor shaft and said second disk being axially driven by said first disk.

15. An assembly according to claim 14, wherein said first disk has a step shaped profile including:
a first step extending axially along and driven by a step down gear drivingly connected to the motor shaft, and
a second step receiving a roller assembly which axially drives the second disk.

16. An assembly according to claim 15, wherein the second sloped disk is axially and radially guided in the housing by means of a ring.

17. An assembly according to claim 14, wherein said conversion device includes an adjusting element drivingly interposed between the second disk and the brake actuating piston.

18. An assembly according to claim 17, comprising a second electric motor and a second conversion device operable on the adjusting element separately from the first mentioned motor and conversion device.

19. An assembly according to claim 17, wherein at least one restoring device supported on the housing applies a restoring force to the adjusting element, to the first and second sloped disks and to a bearing which is opposed to the force generated by the second sloped disk during a rotation of the first sloped disk.

* * * * *